US010035268B2

(12) United States Patent
Murata

(10) Patent No.: US 10,035,268 B2
(45) Date of Patent: Jul. 31, 2018

(54) MEASUREMENT SYSTEM USED FOR CALIBRATING MECHANICAL PARAMETERS OF ROBOT

(71) Applicant: FANUC CORPORATION, Yamanashi (JP)

(72) Inventor: Yuusuke Murata, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 143 days.

(21) Appl. No.: 15/263,967

(22) Filed: Sep. 13, 2016

(65) Prior Publication Data
US 2017/0072566 A1    Mar. 16, 2017

(30) Foreign Application Priority Data

Sep. 14, 2015 (JP) ................. 2015-180613
Aug. 30, 2016 (JP) ................. 2016-168082

(51) Int. Cl.
| G06F 19/00 | (2018.01) |
| B25J 9/16 | (2006.01) |
| G01B 11/02 | (2006.01) |
| G01B 11/14 | (2006.01) |

(52) U.S. Cl.
CPC ........... B25J 9/1692 (2013.01); G01B 11/026 (2013.01); G01B 11/14 (2013.01); *G05B 2219/39045* (2013.01)

(58) Field of Classification Search
CPC ...... B25J 9/1692; G01B 11/026; G01B 11/14; G05B 2219/39045
See application file for complete search history.

(56) References Cited

U.S. PATENT DOCUMENTS

| 8,679,125 B2* | 3/2014 | Smith ................ A61B 17/1664 606/79 |
| 8,958,912 B2* | 2/2015 | Blumberg .............. B25J 9/0087 700/259 |
| 9,566,122 B2* | 2/2017 | Bowling ................ A61B 34/32 |
| 9,652,591 B2* | 5/2017 | Moctezuma de la Barrera ............... G06F 19/3412 |

(Continued)

FOREIGN PATENT DOCUMENTS

| EP | 2894012 A1 | 7/2015 |
| JP | 08174453 A | 7/1996 |

(Continued)

*Primary Examiner* — Ian Jen
(74) *Attorney, Agent, or Firm* — RatnerPrestia

(57) ABSTRACT

A measurement system able to perform measurement by a simpler manner when performing measurement a plurality of times for a plurality of targets. The measurement system utilizes the light receiving device to measure targets fastened to the machine tool. The robot is moved so that the difference between a target on a light receiving surface of the light receiving device and an image acquired by the light receiving device in the state where the machine tool is stopped at each stop position and the robot is placed in the measurement position and posture becomes within a predetermined error. A plurality of stop positions and a plurality of end point positions and postures after the movement are used as the basis to simultaneously find the error of the mechanical parameters of the robot and the relative relationship between the robot coordinate system $\Sigma b$ and the machine tool coordinate system $\Sigma m$.

12 Claims, 8 Drawing Sheets

(56) References Cited

U.S. PATENT DOCUMENTS

| | | | |
|---|---|---|---|
| 9,782,230 B2* | 10/2017 | Smaby | A61B 34/30 |
| 2008/0161829 A1* | 7/2008 | Kang | B25J 9/101 |
| | | | 606/130 |
| 2011/0066393 A1 | 3/2011 | Groll et al. | |

FOREIGN PATENT DOCUMENTS

| | | |
|---|---|---|
| JP | 2005-201824 A | 7/2005 |
| JP | 2005342832 A | 12/2005 |
| JP | 2008-012604 A | 1/2008 |
| JP | 2012006122 | 1/2012 |
| WO | 2014037993 A1 | 3/2014 |

* cited by examiner

MEASUREMENT SYSTEM USED FOR CALIBRATING MECHANICAL PARAMETERS OF ROBOT

BACKGROUND OF INVENTION

1. Field of the Invention

The present invention relates to a measurement system including a robot and a machine tool.

2. Description of the Related Art

To improve a precision of positioning over an entire range of operation of an industrial use multi-articulated robot, it is known to automatically calibrate the mechanical parameters.

Japanese Patent Publication No. 2008-012604 discloses a method of using a light receiving device recognizing a target so as to automatically measure a relationship between a front end position of a robot and displacement of a controllable drive axis and to find dimensional error of component parts and amounts of their elastic deformation and other error that can be formulated. Further, Japanese Patent Publication No. 2008-012604 describes to realize improvement of precision over the entire range of operation of a robot by setting a plurality of targets and performing the measurement a plurality of times for the targets.

When setting a plurality of targets within the range of work of a robot and performing measurement a plurality of times for the targets for the purpose of uniformly improving the precision of positioning in the range of work of the robot, it is necessary to add the errors of the different target positions to the parameters to be identified and calculated. For this reason, it is necessary to increase the number of times of measurement along with the increase in the number of targets set. For example, in the invention described in Japanese Patent Publication No. 2008-012604, if the positions of the targets to be measured increase by 1, the error parameters of the target positions increase by 3. If increasing the measurement positions and postures by 1, the number of formulas able to be utilized for identification and calculation increases by 3, so to deal with the increase in error parameters, every time increasing the positions of the targets by 1, it is necessary to increase the measurement positions and postures by 1.

Japanese Patent Publication No. 2005-201824 also describes related art.

SUMMARY OF INVENTION

A measurement system enabling measurement by a simpler manner when performing measurement a plurality of times for a plurality of targets for the purpose of uniformly improving the precision of positioning in the range of work of a robot has therefore been sought.

In a preferred embodiment of the present application, there is included a measurement system comprising a multi-articulated robot including a light receiving device at a front end of an arm and a machine tool included inside a range of operation of the robot and utilizing the light receiving device to measure a target fastened to the machine tool, where the target has a geometric feature enabling identification of information on a position of an image of the target formed on a light receiving surface of the light receiving device and information on a length relating to a distance between the light receiving device and the target, and the measurement system further includes a measurement position/posture determining part determining a plurality of stop positions of the machine tool and a plurality of measurement positions and postures of the robot whereby when the machine tool is arranged at the plurality of stop positions, the target is included in a field of vision of the light receiving device, a positioning part successively positioning the machine tool at the plurality of stop positions and successively positioning the robot at the plurality of measurement positions and postures corresponding to the plurality of stop positions, a target detecting part forming the image of the target on the light receiving surface of the light receiving device and using information on the position of the target and information on the length as the basis to detect information on the distance between the light receiving device and the target, a robot moving part moving the robot so that in a state where the machine tool is at a stop position and the robot is at a measurement position and posture, a difference between a position of the target on the light receiving surface of the light receiving device and a predetermined location of the image acquired by the light receiving device becomes within a predetermined error and a difference of information on the distance and a predetermined value becomes within a predetermined error, a robot end point storing part storing positions and postures of the robot after being moved by the robot moving part as end points linked with the stop positions of the machine tool and the measurement positions and postures, and a calculating part using the plurality of end points corresponding to the plurality of stop positions and the plurality of measurement positions and postures and the plurality of stop positions as the basis to simultaneously find error of the mechanical parameters of the robot and a correspondence between the coordinate system of the robot and the coordinate system of the machine tool.

In a preferred embodiment of the present application, the measurement position/posture determining part is configured to determine the plurality of measurement positions/postures so that a distance between the light receiving device and a predetermined point of the target is constant and a slant of a line of sight of the light receiving device passing through the predetermined point differs.

In a preferred embodiment of the present application, the measurement position/posture determining part is configured to determine the plurality of measurement positions/postures so that a posture of a line of sight of the light receiving device passing through a predetermined point of the target is constant and a distance between the light receiving device and the predetermined point of the target differs.

In a preferred embodiment of the present application, the measurement position/posture determining part is configured to automatically generate the plurality of measurement positions and postures.

In a preferred embodiment of the present application, the calculating part is configured to utilize nonlinear optimization including the Newton-Raphson method, a genetic algorithm, and a neural network so as to find the error of the mechanical parameters of the robot.

In a preferred embodiment of the present application, the light receiving device is a CCD camera configured to capture a 2D image.

In a preferred embodiment of the present application, the target has a circular mark and the information on length includes a long axis length of an oval corresponding to the image of the mark formed on the light receiving surface of the light receiving device.

In a preferred embodiment of the present application, the light receiving device is a PSD configured to find a center of gravity of distribution of the amount of light received.

In a preferred embodiment of the present application, the target is a light emitting device.

In a preferred embodiment of the present application, the calculating part is configured to use the error between the position of a point of interest of the light receiving device and the position of a predetermined point of the mark formed on the target as the basis to find the error of the mechanical parameters of the robot.

According to the present invention, there is included a calibration method for calibrating mechanical parameters of a robot using a measurement system comprising a multi-articulated robot including a light receiving device at a front end of an arm and a machine tool included inside a range of operation of the robot, the calibration method comprising determining a plurality of stop positions of the machine tool and a plurality of measurement positions and postures of the robot whereby when the machine tool is arranged at the plurality of stop positions, a target fastened to the machine tool is included in a field of vision of the light receiving device, successively positioning the machine tool at the plurality of stop positions and successively positioning the robot at the plurality of measurement positions and postures corresponding to the plurality of stop positions, forming the image of the target on the light receiving surface of the light receiving device and using information on the position of the target and the information on length as the basis to detect information on the distance between the light receiving device and the target, moving the robot so that in a state where the machine tool is at a stop position and the robot is at a measurement position and posture, a difference between a position of the target on the light receiving surface of the light receiving device and a predetermined location of the image acquired by the light receiving device becomes within a predetermined error and a difference of information on the distance and a predetermined value becomes within a predetermined error, storing positions and postures of the robot after being moved by the robot moving part as end points linked with the stop positions of the machine tool and the measurement positions and postures, and using the plurality of end points corresponding to the plurality of stop positions and the plurality of measurement positions and postures and the plurality of stop positions as the basis to simultaneously find error of the mechanical parameters of the robot and a correspondence between the coordinate system of the robot and the coordinate system of the machine tool.

In a preferred embodiment of the present application, the method further includes, when finding error of the mechanical parameters of the robot, using an error between a position of a point of interest of the light receiving device and a position of a predetermined point of a mark formed on the target as the basis to find error of the mechanical parameters of the robot.

BRIEF DESCRIPTION OF DRAWINGS

These and other objects, features, and advantages of the present invention will become clearer by referring to the detailed description of illustrative embodiments of the present invention shown in the attached drawings.

DETAILED DESCRIPTION

Below, embodiments of the present invention will be explained with reference to the attached drawings. The component elements in the illustrated embodiments are suitably changed in scale for assisting understanding of the present invention. Further, the same or corresponding component elements use the same reference notations.

Figure 1:
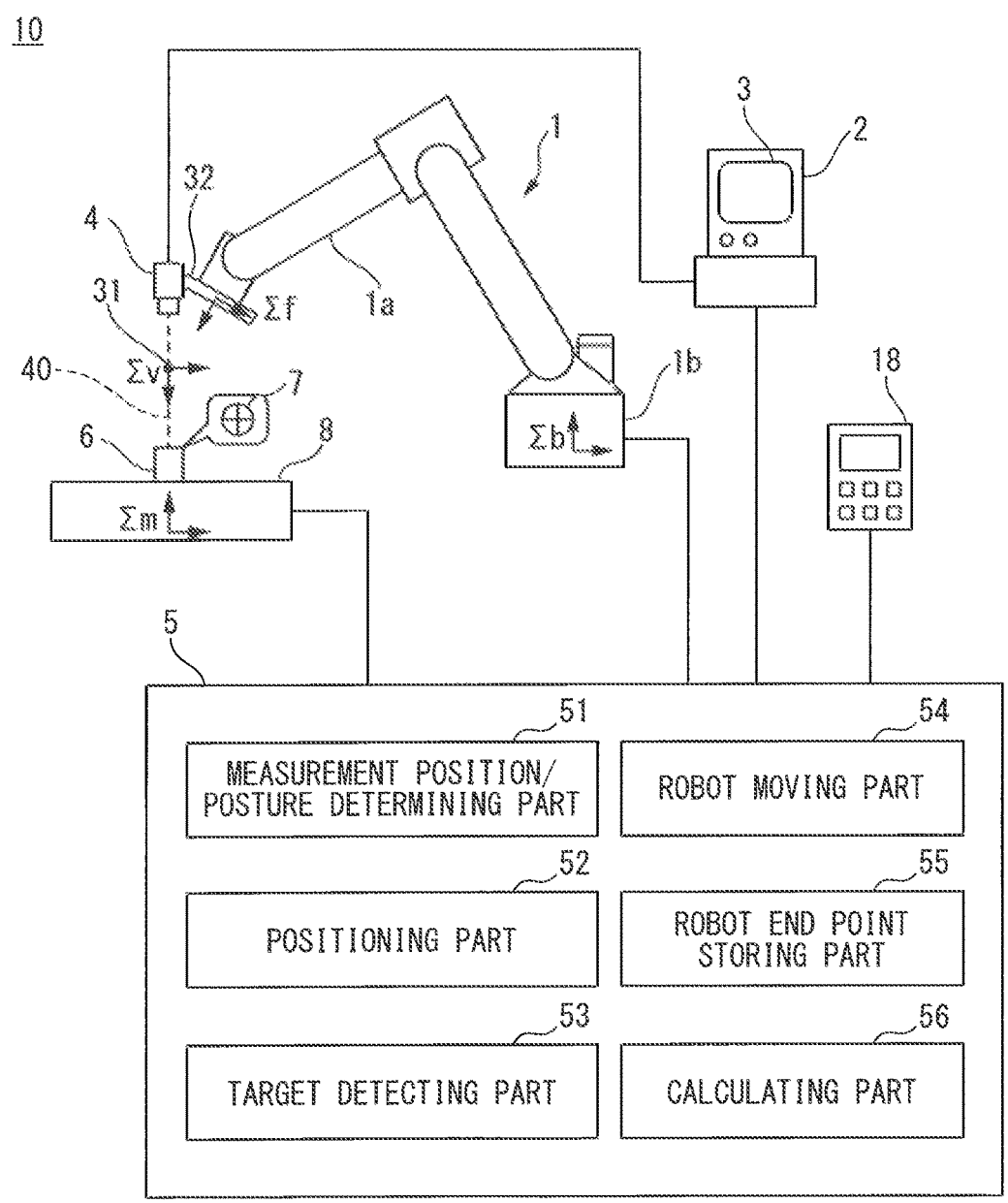
FIG. 1 is a view schematically showing the configuration of a measurement system according to one embodiment.

FIG. 1 is a view schematically showing a measurement system 10 according to one embodiment. The measurement system 10 includes a multi-articulated robot 1 and a machine tool 8 provided inside the range of operation of the robot 1. As shown in FIG. 1, the robot 1 is a robot having any known configuration including an arm 1a and base 1b. The robot 1 is connected to a robot controller 5 controlling the robot 1. At the front end of the arm 1a, that is, at a tool mounting surface 32, a camera 4 is attached.

The robot 1 is set with a robot coordinate system $\Sigma b$ and a mechanical interface coordinate system $\Sigma f$. The robot coordinate system $\Sigma b$ is a coordinate system set at a base 1b of the robot 1, that is, set in the work space. The mechanical interface coordinate system $\Sigma f$ is a coordinate system set at the tool mounting surface 32 and changing in position and posture along with operation of the robot 1. The robot controller 5 is configured to constantly acquire the position and posture of the origin of the mechanical interface coordinate system $\Sigma f$.

A known teaching console 18 including operating keys is connected to the robot controller 5. An operator can manually operate the operating keys so as to operate the robot 1.

The machine tool 8 is set with a machine tool coordinate system $\Sigma m$. The machine tool 8 includes known operating keys. An operator can operate the operating keys to thereby operate the machine tool 8 and can acquire an amount of change of position of a target 6 fastened to the machine tool 8 in the machine tool coordinate system $\Sigma m$.

The camera 4 is, for example, a CCD camera. This is a known light receiving device having the function of detecting a 2D image at a light receiving surface (CCD array surface) by capturing an image. The camera 4 is connected to an image processing apparatus 2 including a monitor 3 comprised of an LCD or CRT etc. In the present embodiment, the camera 4 is used for capturing an image of a mark 7 of a target 6 fastened to the machine tool 8. In one embodiment, the target 6 may be a light emitting device including a light source. In this case, a PSD (position sensitive detector) configured to find the center of gravity of the distribution of the amount of light received is used as a light receiving device.

Figure 2:
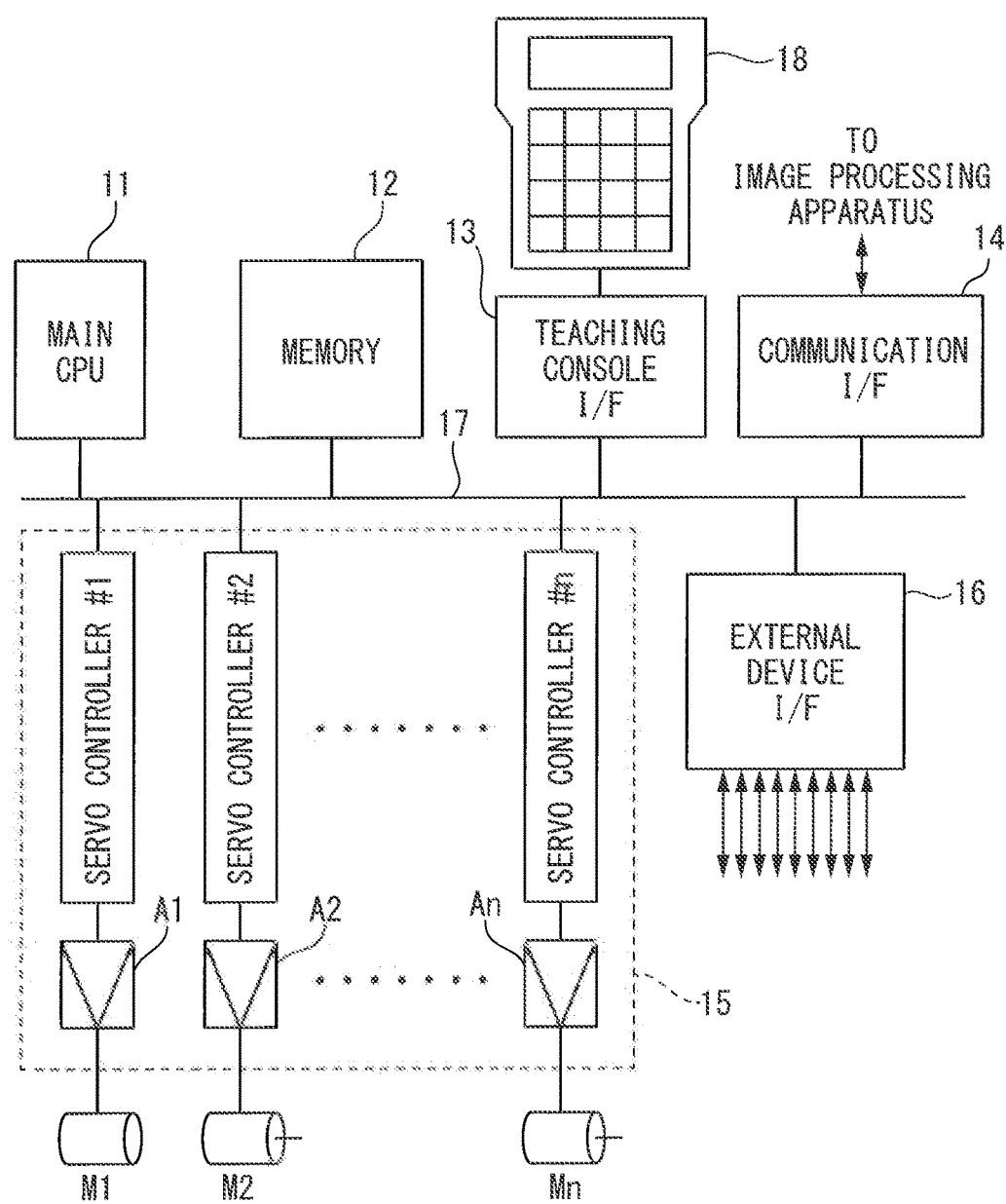
FIG. 2 is a view showing a block configuration of a robot controller according to one embodiment.

The robot controller 5 has a known block configuration such as shown in FIG. 2. That is, the robot controller 5 includes a memory 12, teaching console interface 13, external device input/output interface 16, servo control part 15, and communication interface 14 connected in parallel to a bus 17 connected to a main CPU (below, simply referred to as a "CPU") 11. The memory 12 includes a RAM, ROM, nonvolatile memory, etc.

The teaching console 18 connected to the teaching console interface 13 has a known configuration including a display. An operator can manually operate the teaching console 18 to thereby prepare, correct, and record an operating program for the robot or set various parameters or play, run, jog, etc. the operating program taught.

A system program controlling the basic functions of the robot 1 and robot controller 5 is stored in the ROM of the memory 12. Further, the operating program of the robot taught in accordance with the application and the related set data are stored in a nonvolatile memory of the memory 12. Further, programs and parameters and other data for the various processing explained later (movement of robot when finding mechanical parameters and processing for communication with image processing apparatus for same etc.) are also stored in the nonvolatile memory of the memory 12.

The RAM of the memory 12 is used for temporarily storing data relating to the various processing performed by the CPU 11. The servo control part 15 includes servo controllers #1 to #n ("n" is the total number of axes of the robot, for example, n=6). The servo control part 15 outputs torque commands to the servo amplifiers A1 to An based on the movement commands and feedback signals received from pulse encoders (not shown) provided at the different axes. The movement commands are prepared by a known method in accordance with the processing for control of the robot 1 (preparation of path plan and interpolation, inverse transformation, etc. based on the path plan).

The servo amplifiers A1 to An supply current to the servo motors of the different axes to drive the same based on the corresponding torque commands. The communication interface 14 is connected to the image processing apparatus 2 (see FIG. 1). Through the communication interface 14, commands relating to measurement explained later and data of measurement results etc. are sent and received between the image processing apparatus 2 and the robot controller 5.

Figure 3:
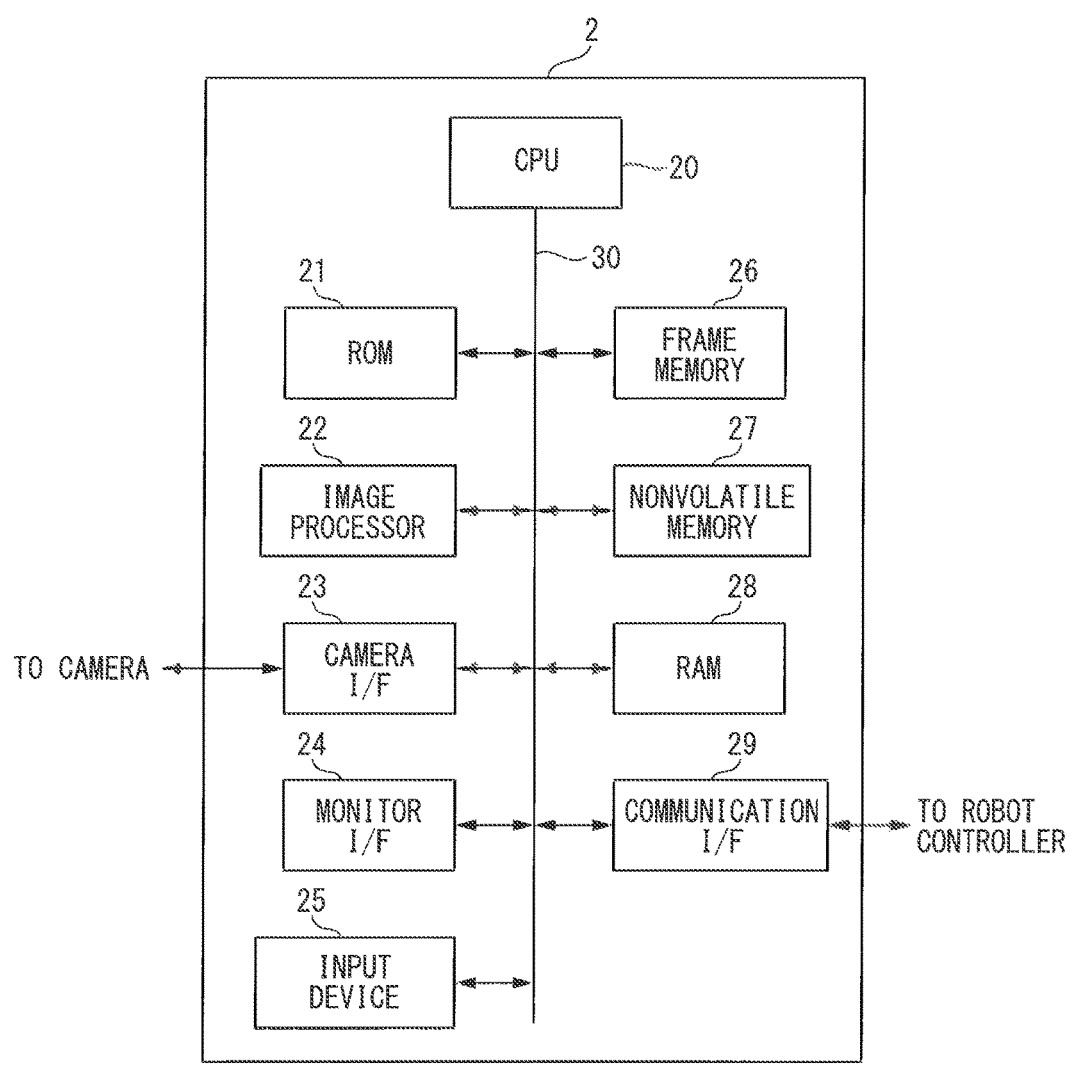
FIG. 3 is a view showing a block configuration of an image processing apparatus according to one embodiment.

The image processing apparatus 2 has a known block configuration such as shown in FIG. 3. The image processing apparatus 2 has a CPU 20 configured from a microprocessor. The CPU 20 is connected through a bus line 30 to a ROM 21, image processor 22, camera interface 23, monitor interface 24, input device (I/O) 25, frame memory (image memory) 26, nonvolatile memory 27, RAM 28, and communication interface 29.

The camera interface 23 is connected to an image capturing means comprised of a camera 4 (for example, a CCD camera). The camera 4 has an electronic shutter function and is configured to capture an image in response to an image capturing command received through the camera interface 23. The image data captured by the camera 4 is stored through the camera interface 23 in the form of a grayscale signal in the frame memory 26.

The monitor interface 24 is connected to the monitor 3 (see FIG. 1). The monitor 3 displays the image being captured by the camera 4, a past image stored in the frame memory 26, an image processed by the image processor 22, etc. according to need.

As shown in FIG. 1, the camera 4 attached to the tool mounting surface 32 of the robot 1 captures an image of the mark 7 of the target 6 fastened to the machine tool 8. The image signal of the mark 7 stored in the frame memory 26 is analyzed utilizing the image processor 22 so that the 2D position and size etc. are found (details explained later). The mark 7 is a geometric feature of the target 6 enabling identification of information on the position of image of the target 6 formed on the light receiving surface of the camera 4 and information on the length relating to the distance between the camera 4 and the target 6.

The analysis program and parameters etc. required for image processing are stored in the nonvolatile memory 27. Further, the RAM 28 is used for temporarily storing data relating to various processing performed by the CPU 20. The communication interface 29 is connected through the communication interface 14 of the robot controller 5 to the robot controller 5.

Referring again to FIG. 1, a line of sight 40 of the camera 4 is drawn as a straight line extending from a representative point of the camera 4 (for example, center of camera lens) toward the target 6. The coordinate system $\Sigma v$ shown in FIG. 1 is a coordinate system representing the line of sight 40. The coordinate system $\Sigma v$ is set so that the origin is positioned on the line of sight 40 and one coordinate axis (for example, Z-axis) matches with the line of sight 40.

Note that, the mechanical interface coordinate system $\Sigma f$ is a coordinate system representing the position and posture of the tool mounting surface 32 as explained above, but in this Description, it is also a coordinate system representing the position and posture of the robot 1. That is, unless particularly alluded to, the "position of the robot" means the position of the origin of the mechanical interface coordinate system $\Sigma f$ in the robot coordinate system $\Sigma b$. If the "position of the robot" includes the posture of the robot, the "position of the robot" means the position and posture of the origin of the mechanical interface coordinate system $\Sigma f$ in the robot coordinate system $\Sigma b$.

The measurement system 10 according to the present embodiment detects the mark 7 of the target 6 for calibration of the mechanical parameters of the robot 1. As shown in FIG. 1, the robot controller 5 includes a measurement position/posture determining part 51, positioning part 52, target detecting part 53, robot moving part 54, robot end point storing part 55, and calculating part 56.

The measurement position/posture determining part 51 determines a plurality of stop positions of the machine tool 8 and a plurality of measurement positions and postures of the robot 1 so that the target 6 is included in the field of vision of the camera 4 when the machine tool 8 is at the plurality of stop positions.

The measurement position/posture determining part 51 may be configured to determine the plurality of measurement positions and postures so that the distance between the camera 4 and a predetermined point of the target 6 is constant and the slant of the line of sight of the camera 4 passing through the predetermined point differs.

The measurement position/posture determining part 51 may also be configured to determine the plurality of measurement positions and postures so that the posture of the line of sight of the camera 4 passing through the predetermined point of the target 6 is constant and distance between the camera 4 and the predetermined point of the target 6 differs.

The measurement position/posture determining part 51 may also be configured to automatically generate a plurality of measurement positions and postures.

The positioning part 52 successively positions the machine tool 8 at a plurality of stop positions and successively positions the robot 1 at a plurality of measurement positions and postures corresponding to the plurality of stop positions.

The target detecting part 53 forms an image of the target 6 on the light receiving surface of the camera 4 and uses the information on the position of the target 6 and the information on the length as the basis to detect information on the distance between the camera 4 and target 6.

The robot moving part 54 moves the robot 1 so that in the state where the machine tool 8 is at a stop position and the robot 1 is at a measurement position and posture, the difference in the position of the target 6 on the light receiving surface of the camera 4 and a predetermined location of the image obtained by the camera 4 becomes within a predetermined error and the difference in the information on the distance and a predetermined value becomes within a predetermined error.

The robot end point storing part 55 stores the position and posture of the robot 1 after being made to move by the robot moving part 54 as an end point linked with the stop position and measurement position and posture of the machine tool 8.

The calculating part 56 uses the plurality of end points corresponding to the plurality of stop positions and plurality of measurement positions and postures and the plurality of stop positions as the basis to simultaneously find the error of the mechanical parameters of the robot 1 and the relative relationship between the robot coordinate system $\Sigma b$ and the machine tool coordinate system $\Sigma m$.

The calculating part 56 may be configured to utilize nonlinear optimization including the Newton-Raphson method, a genetic algorithm, and a neural network to find the error of the mechanical parameters of the robot 1.

Figure 4:
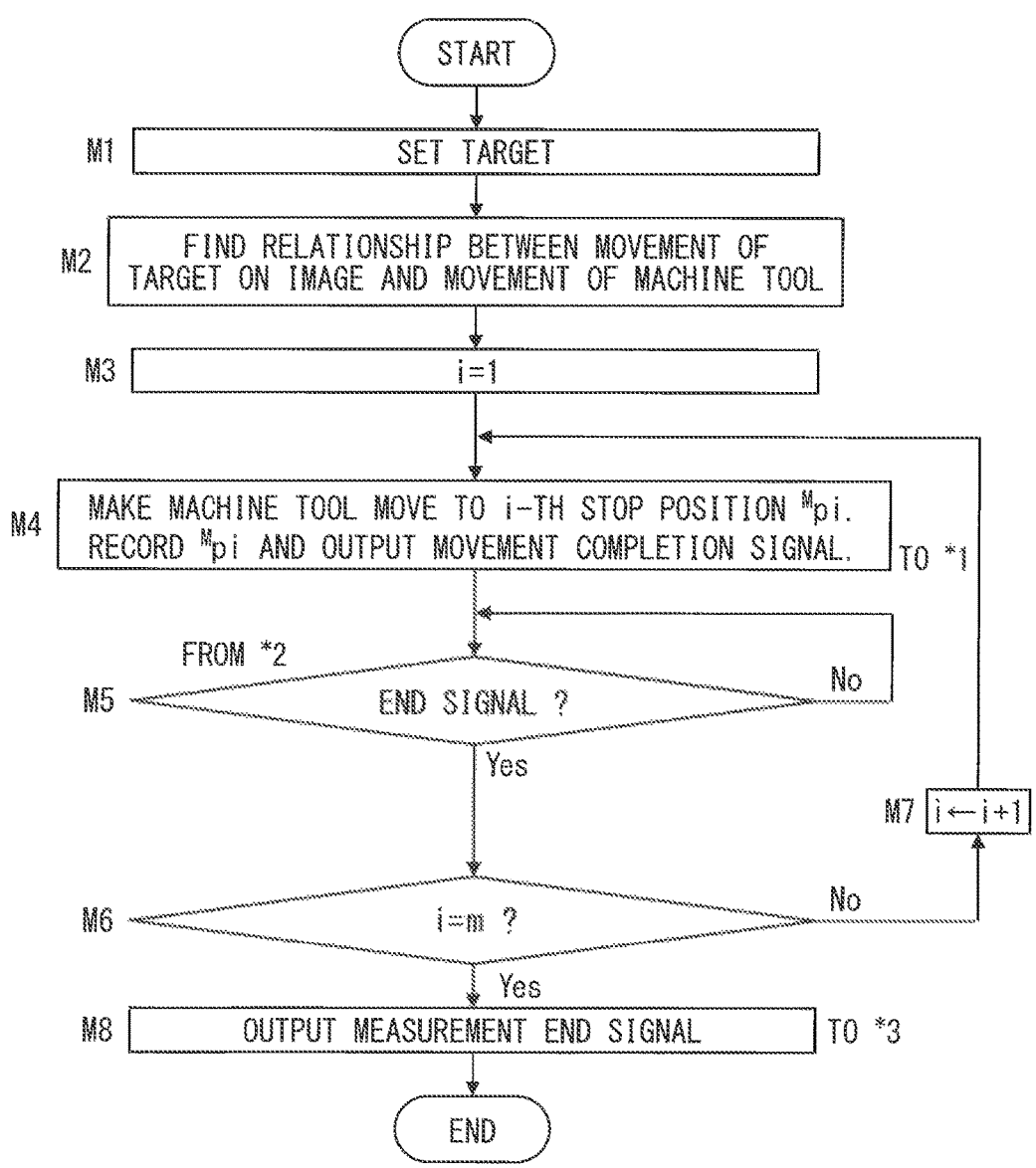
FIG. 4 is a flow chart schematically showing processing of a machine tool performed in accordance with one embodiment.
Figure 5:
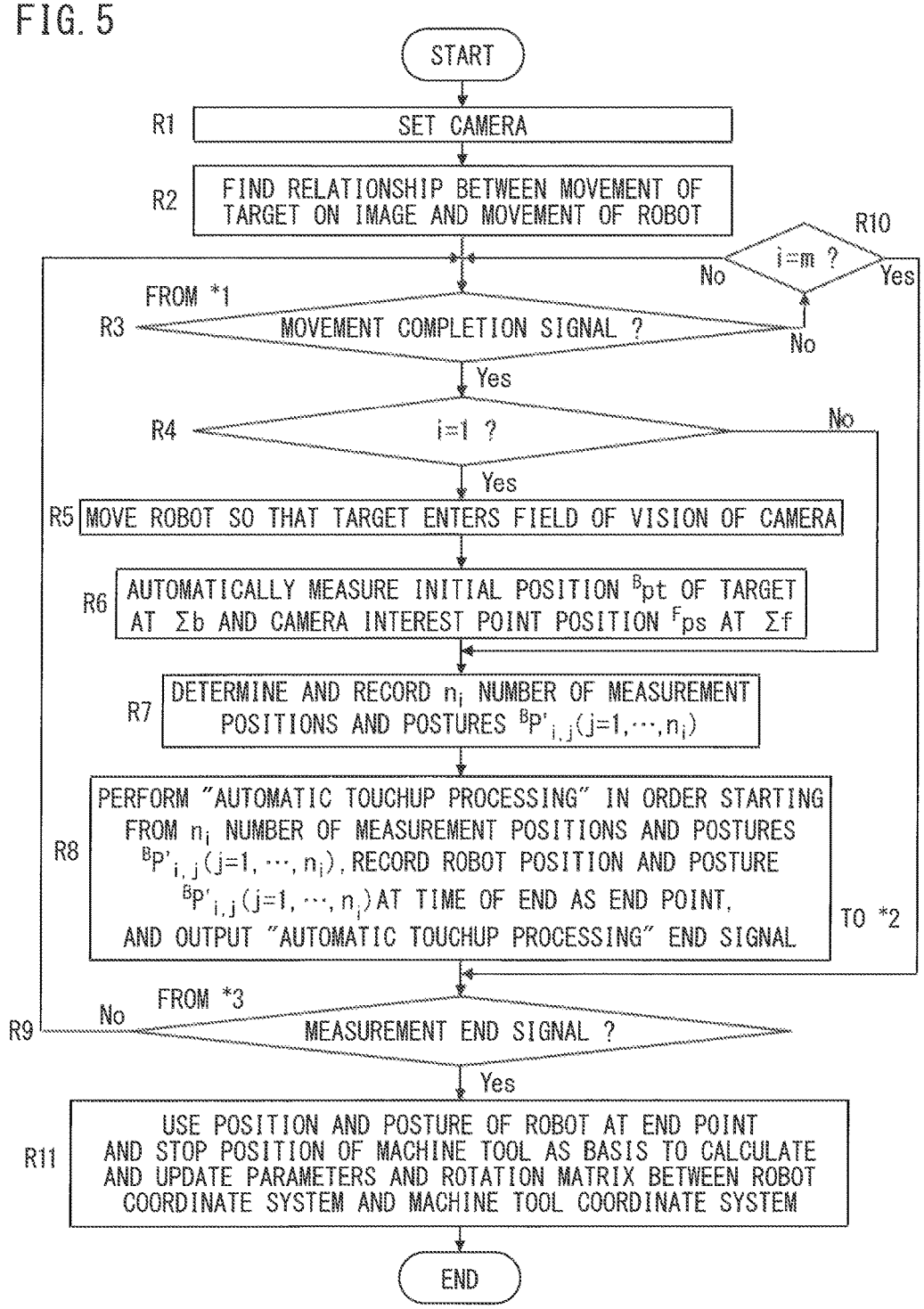
FIG. 5 is a flow chart schematically showing processing of a robot performed in accordance with one embodiment.

Referring to the flow charts of FIG. 4 and FIG. 5, a method of calculation of mechanical parameters performed in the measurement system according to the present embodiment will be explained. FIG. 4 is a flow chart showing an outline of the processing of the machine tool 8, while FIG. 5 is a flow chart showing an outline of the processing of the robot 1.

At step M1, the target 6 is fastened to the machine tool 8. At step R1, the camera 4 is attached to the tool mounting surface 32 of the robot 1. The target 6 and camera 4 need not be at their accurate positions, but are fastened so that the positions do not change during measurement.

At step M2, the relationship between the movement direction and movement distance of the target 6 on the image and the movement direction and movement distance of the machine tool 8 is found. At step R2, the relationship between the movement direction and movement distance of the target 6 on the image and the movement direction and movement distance of the robot 1 is found. These relationships are used for finding how to make the robot 1 or machine tool 8 move so as to make the target 6 on the image move in a certain direction by exactly a certain distance. For example, the robot 1 or machine tool 8 is made to move by translational, motion several times and the feature of the image of the target 6 formed on the light receiving surface of the camera 4 is detected each time so as to find the relationship between the movement direction and movement distance at each axis of the robot 1 or machine tool 8 and the change in the feature of the target 6.

In the present embodiment, measurement is performed for "m" number of stop positions of the machine tool 8 by $n_i$ number (i=1, 2, . . . , m) of measurement positions and postures of the robot 1. The consecutive number of the stop position of the machine tool 8 is indicated by the index "i". The i-th stop position of the machine tool in the machine tool coordinate system $\Sigma m$ is indicated by $^M p_i$.

At step M3, "1" is entered for the index "i". At step M4, an operator makes the machine tool 8 move to the initial stop position $^M p_1$. The machine tool 8 records $^M p_1$ and sends a movement completion signal to the robot controller 5.

When the robot controller 5 receives the movement completion signal (step R3), the routine proceeds to step R4 where it is judged if the index "i" is "1". If the index "i" is "1", the routine proceeds to step R5 where an operator makes the robot 1 move so that when the machine tool 8 is at the stop position $^M p_1$, the mark 7 of the target 6 enters the field of vision of the camera 4 (for example, the mark 7 is displayed on the monitor 3 of the image processing apparatus 2).

At step R6, the position (initial position of target 6) $^B p_t$ of a predetermined point of the mark 7 at the robot coordinate system $\Sigma b$ and the position $^F p_s$ of the point of interest 31 of the camera 4 at the mechanical interface coordinate system $\Sigma f$ when the machine tool is at a stop position $^M p_1$ are automatically measured.

To perform the measurement at step R6, for example, the known art described in Japanese Patent Publication No. 2005-201824 can be utilized. According to this known art, the point of interest 31 of the camera 4 is matched with a predetermined point of the mark 7 in the robot coordinate system $\Sigma b$. In that state, measurement is performed from a plurality of directions (at a plurality of robot postures) to calculate the position $^F p_s$ of the point of interest 31 and the position $^B p_t$ of a predetermined point of the mark 7. If considering the point of interest 31 in place of the tool center point (TCP) of the tool attached to the hand of the robot, this method is similar to the conventional method of mechanically touching up predetermined points of the robot coordinate system from a plurality of directions to calculate positions of the TCP and a predetermined point of the mark 7.

Note that, at this stage, there is no need to precisely calculate the positions of the camera 4 and target 6. That is, when changing the posture of the robot 1 near a point of interest 31 in the state where the point of interest 31 is made to match a predetermined point of the target 6, it is sufficient that the target 6 not deviate from the field of vision of the camera 4.

At step R7, $n_i$ number of measurement positions and postures $^B P'_{i,j}$ (j=1, 2, . . . , $n_i$) are determined for the position of the target 6 when the machine tool 8 is at a stop position $^M p_i$. The robot controller 5 records the measurement positions and postures $^B P'_{i,j}$ (j=1, 2, . . . , $n_i$).

In this embodiment, the measurement positions and postures $^B P'_{i,j}$ (j=1, 2, . . . , $n_i$) are automatically calculated as explained later. First, when the index "i" is "1", "n" number of positions and postures of the robot 1 with respect to the position of the target 6 when the machine tool is at a stop position $^M p_1$ are automatically calculated and recorded based on the initial position $^B p_t$ of the target 6 at the robot coordinate system $\Sigma b$ calculated at step R6 and the position $^F p_s$ of the point of interest 31 of the camera 4 at the mechanical interface coordinate system $\Sigma f$.

The "n" number of positions and postures may include, as a first example, a plurality of positions and postures where the distance between the camera 4 and a predetermined point of the mark 7 is constant and the slant of the light of sight 40 of the camera 4 passing through that predetermined point differs. Alternatively, the "n" number of positions and postures may include, as a second example, a plurality of positions and postures where the posture of the light of sight 40 of the camera 4 passing through a predetermined point of the mark 7 is constant and the distance between the camera 4 and that predetermined point differs.

Figure 6:
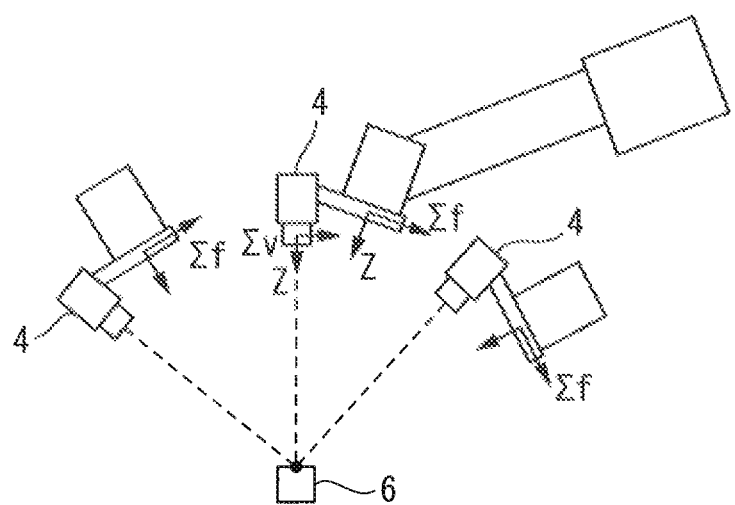
FIG. 6 is an explanatory view related to the processing at step R7 of the flow chart of FIG. 5.

FIG. 6 show three positions and postures according to the first example where the distance between the camera 4 and a predetermined point of the mark 7 is constant and the slant of the light of sight 40 of the camera 4 passing through that predetermined point differs.

Note that, to automatically calculate the "n" number of positions and postures, first, at step R6, the position and posture of the robot 1 obtained by positioning the point of interest 31 of the camera 4 with the target 6 may be defined as the basic position and posture, the position of the point of interest 31 of the camera 4 may be made constant, then a predetermined value may be added to the posture angle of the camera 4. Due to this, the plurality of positions and postures included in the range of operation of the robot 1 are automatically generated.

Alternatively, it is possible to employ the method of making the position of the point of interest 31 of the camera 4 constant, then calculating the range of posture angle of the camera 4 corresponding to the range of operation of the robot 1 and to generate a plurality of positions and postures for any plurality of angles included in that range of posture angle (for example, angles obtained by equally dividing range of posture angle).

After automatically calculating and recording the "n" number of positions and postures of the robot for the position of the target 6 when the machine tool 8 is at a stop position $^{M}p_1$ in this way, when the index "i" is "1", $n_1$ number of positions and postures are selected from the "n" number of positions and postures and are determined and recorded as the $n_1$ number of measurement positions and postures $^{B}P'_{1,j}$ (j=1, 2, . . . , $n_1$) of the robot 1 for the position of the target 6 when the machine tool 8 is at a stop positions $^{M}p_1$.

At step R8, "automatic touchup processing" is successively performed starting from the $n_i$ number of measurement positions and postures $^{B}P'_{i,j}$ (j=1, 2, . . . , $n_i$) of the robot 1 for the position of the target 6 when the machine tool 8 is at a stop position $^{M}p_1$. The position and posture $^{B}P_{i,j}$ (j=1, 2, . . . , $n_i$) of the robot 1 at the point of time of the end of the "automatic touchup processing" is recorded as the end point, then the robot controller 5 sends an "automatic touchup processing" end signal to the machine tool 8. In the "automatic touchup processing", the robot 1 is made to move so that the value showing the geometric feature of the shape of the image of the mark 7 formed on the light receiving surface of the camera 4 or a parameter satisfies a predetermined condition.

Details of the "automatic touchup processing" will be explained with reference to FIG. 7A, FIG. 7B, FIG. 8A, FIG. 8B, and FIG. 9. For example, the mark 7 has a circular shape in which a cross showing the position of the center is drawn. The geometric features of the image of the target 6 formed on the light receiving surface of the camera 4 are made the center position and long axis length of the oval (see FIG. 7B). Usually, the light receiving surface of the camera 4 is slanted with respect to the plane of the mark 7 of the target 6, so a circular mark 7 appears as an oval at the image. The mark 7 may be another shape other than a circle or may be a letter or symbol etc.

Figure 7A:
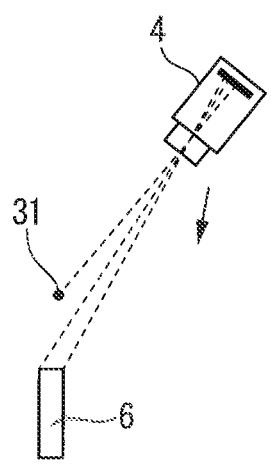
FIG. 7A is a view showing a relative positional relationship of a camera and target.
Figure 7B:
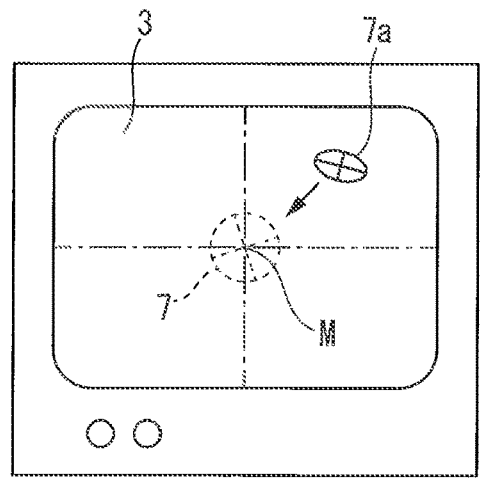
FIG. 7B is a view showing a monitor screen corresponding to FIG. 7A.

If the camera 4 and the target 6 become off in position (see FIG. 7A), as shown in FIG. 7B, the oval shaped mark image 7a formed on the light receiving surface deviates from a predetermined point of the light receiving surface (for example, the center M of the light receiving surface.).

Further, the long axis length of the mark image 7a becomes shorter than the diameter of the mark 7.

Figure 8A:
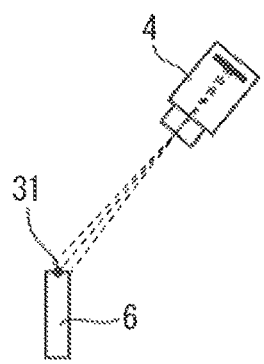
FIG. 8A is a view showing a relative positional relationship of a camera and target.
Figure 8B:
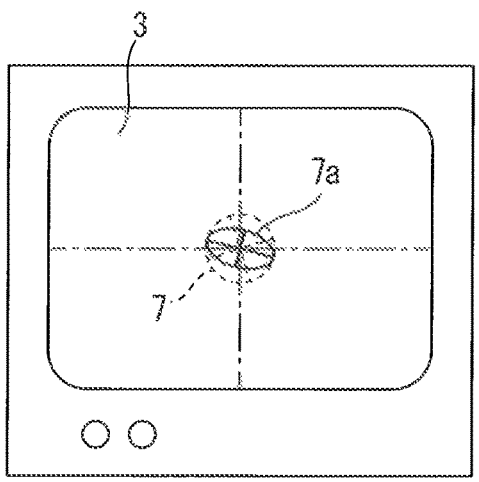
FIG. 8B is a view showing a monitor screen corresponding to FIG. 8A.

Therefore, as shown in FIG. 8A and FIG. 8B, the robot 1 is made to move so as to change the relative positional relationship between the camera 4 and the target 6 so that the center of the mark image 7a matches the center M of the light receiving surface and so that the long axis length of the mark image 7a matches the diameter of the mark 7.

More specifically, the robot 1 is automatically made to move so that the difference between the center of the mark image 7a on the light receiving surface and the center M of the light receiving surface and the difference of the long axis length of the mark image 7a and the diameter of the mark 7 become within predetermined errors. On the light receiving surface, image processing may be used to detect the features of the mark image 7a, so the above processing can be performed in accordance with the results of detection.

Figure 9:
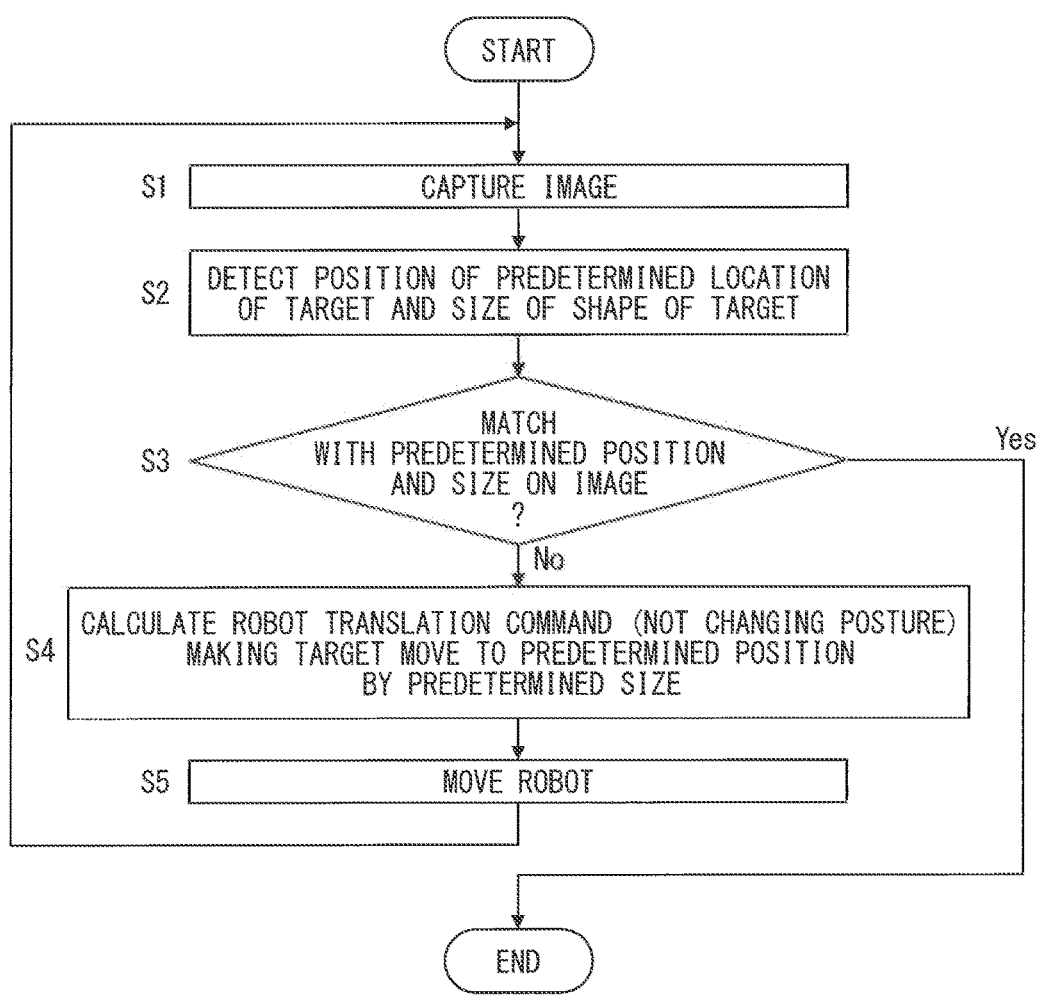
FIG. 9 is a flow chart schematically showing processing at step R8 of the flow chart of FIG. 5.

Referring to FIG. 9, "automatic touchup processing" for making the mark image 7a captured by the camera 4 move to the center M on the image and match the size of the image will be explained.

At step S1, the camera 4 is used to capture an image of the mark 7. Due to this, for example, the mark image 7a shown in FIG. 7B is obtained.

At step S2, the position and size of the image of the mark 7 on the image (for example, the center position of the mark image 7a on the image and the long axis length of the mark image 7a) are detected by the image processing apparatus 2.

At step S3, it is judged if the position and size of the image of the target 6 found at step S2 respectively match a predetermined point on the image (for example, center point M of light receiving surface) and predetermined length (for example, diameter of mark 7). Specifically, when both the distance between the center point M and the center of the mark image 7a and the difference between the long axis length of the mark image 7a and the diameter of the mark 7 are less than predetermined errors allowable on the image, that is, are the threshold distance $\delta_{image}$, or less, it is judged that the position and size of the target 6 "match" a predetermined point and predetermined length and the processing ends.

If at least one of the above-mentioned difference of distance and the difference of the long axis length and diameter is larger than the threshold distance $\delta_{image}$, it is judged that the position and size of the target 6 "do not match" the predetermined point and predetermined length and the routine proceeds to step S4. Note that, the distance on the image can, for example, be measured by replacement with the number of "pixels" of a square shape corresponding to that distance.

At step S4, a robot translation command is prepared so that the mark image 7a is made to move to the center M on the image and the long axis length of the mark image 7a matches a predetermined value. Here, the "robot translation command" means a movement command for making the robot 1 move without changing the posture of the robot 1, that is, the posture of the mechanical interface coordinate system Σf, in the robot coordinate system Σb fixed in space.

At step S5, the robot 1 is made to move in accordance with the above-mentioned robot translation command. If the robot 1 has finished moving, the routine returns to step S1. Further, the processing of steps S1 to S5 is repeated until a "match" is judged at step S3.

The robot position (end point) at the time when the above-mentioned "automatic touchup processing" ends has a distance between the center position of the mark 7 on the image and a predetermined point and a difference between the long axis length of the mark image 7a and a predetermined size both of the threshold distance $\delta_{image}$ or less.

Referring again to FIG. 4, if the machine tool 8 received an "automatic touchup processing" end signal at step M5, the routine proceeds to step M6. At step M6, it is judged if the index "i" is equal to "m". When the index "i" is smaller than "m", at step M7, the index "i" is incremented by exactly "1" and the routine is returned to step M4. Further, at step M4, an operator makes the machine tool 8 move to the next stop position $^{M}p_i$, the machine tool 8 records the stop position $^{M}p_i$, and a movement completion signal is sent to the robot controller 5.

Referring to FIG. 5, when at step R3 the robot controller 5 receives a movement completion signal, the routine proceeds to step R4. At step R4, it is judged if the index "i" is equal to "1". If the index "i" is larger than "1", the routine proceeds to step R7 where $n_i$ number of measurement positions and postures $^{B}P'_{i,j}$ (j=1, 2, . . . , $n_i$) for the target position when the machine tool 8 is at a stop position $^{M}p_i$ are determined. In the present embodiment, when the index "i" is "1", the "n" number of positions and postures recorded at step R7 is utilized to automatically calculate the measurement positions and postures.

Next, the method of calculation of the measurement position and posture will be explained. First, the relationship of movement of the target 6 and movement, of the machine tool 8 on the image found at step M2 and the relationship of movement of the target 6 and movement, of the robot 1 on the image found at step R2 are used as the basis to find a rotational matrix $^{B}R_M$ showing the relative relationship of posture between the robot coordinate system Σb and the machine tool coordinate system Σm.

Note that, at this stage, the rotation matrix $^{B}R_M$ need not be calculated to a high precision. For example, when making the machine tool 8 move by translation motion so as to make the target 6 move from the state where the target 6 is contained in the field of vision of the camera 4, it is sufficient to make the robot 1 move by translation motion by exactly the movement direction and movement distance of the target 6 at the robot coordinate system Σb calculated from the rotation matrix $^{B}R_M$ so that the target 6 does not deviate from the field of vision of the camera 4.

Further, when the index "i" is "1", $n_i$ number of positions and postures are selected from the "n" number of positions and postures recorded at step R7. The positions and postures made to move by parallel motion by exactly $^{B}R_M(^{M}p_i-^{M}p_1)$ are determined as the $n_i$ number of measurement positions and postures $^{B}P'_{i,j}$ (j=1, 2, . . . , $n_i$) of the robot 1 for the position of the target 6 when the machine tool 8 is at a stop position $^{M}p_i$. The robot controller 5 records the measurement positions and postures $^{B}P'_{i,j}$ (j=1, 2, . . . , $n_i$).

At step R8, "automatic touchup processing" is performed in order starting from $^{B}P'_{i,j}$ (j=1, 2, . . . , $n_i$). The robot position/posture $^{B}P_{i,j}$ (j=1, 2, . . . , $n_i$) at the time of end of the "automatic touchup processing" is recorded as an end point. The robot controller 5 sends an "automatic touchup processing" end signal to the machine tool 8.

When the machine tool 8 receives the "automatic touchup processing" end signal (step M5), the routine proceeds to step M6 where it is judged if the index "i" is equal to "m". If the index "i" is smaller than "m", the routine returns to step M7 where the processing of steps M7, MA, R3, R4, R7, R8, M5, and M6 is repeated.

When at step M6 it is judged that the index "i" is equal to "m", it means that the machine tool 8 has finished being moved to all stop positions. At that time, the routine proceeds to step M8 where the machine tool 8 sends a measurement end signal to the robot controller 5.

When the index "i" is "m", if step R3 is performed before the processing of step M4 is performed or if step R9 is performed before the processing of step M8 is performed, the processing of steps R10, R9, and R3 is repeated.

When at step R9 the robot controller 5 receives a measurement end signal, the stop position of the machine tool 8 and the position and posture of the robot 1 at the end point are used as the basis to calculate and update the mechanical parameters of the robot 1 and the rotation matrix between the robot coordinate system Σb and the machine tool coordinate system Σm. Specifically, at step R11, it is assumed that the position of the point of interest 31 and the position of the target 6 in trio robot coordinate system Σb match for the positions and postures of the robot 1 at the different stop positions of the machine tool 8 and different end points and the error of the "p" number of mechanical parameters $P_{K, 0}=[P_{k,0,1}, P_{k,0,2}, \ldots, P_{k,0,p}]$ of the robot, the error of the position $^{F}p_s=[X_s, Y_s, Z_s]$ of the point of interest 31 at the mechanical interface coordinate system Σf, the error of the position $^{B}p_t=[X_t, Y_t, Z_t]$ of the predetermined point of the mark 7 at the robot coordinate system Σb when the machine tool 8 is at a stop position $^{M}p_1$, and the error of the rotation matrix $^{B}R_M$ between the robot coordinate system Σb and machine tool coordinate system Σm are identified and calculated. The rotation matrix $^{B}R_M$ can be expressed using three variables R=[ϕ, θ, ψ] by Euler angles etc.

The errors of the mechanical, parameter $P_{K,0}$, position $^{F}p_s$ of the point of interest 31, position $^{B}p_t$ of a predetermined point of the mark 7, and the variables R make up error parameter $P_{ID}=[\Delta P_k, \Delta P_s, \Delta P_t, \Delta R]$. The error parameter $P_{ID}$ is identified and calculated as follows.

The position $^{B}p_t$ of the target 6 is the position of the target 6 at the robot coordinate system Σb when the machine tool 8 is at a stop position $^{M}p_1$. Therefore, the position of the target 6 at the robot coordinate system Σb when the machine tool 8 is at a stop position $^{M}p_i$ can be found by calculation of the formula: $^{B}p_t+^{B}R_M(^{M}p_i-^{M}p_1)$ based on the movement distance $(^{M}p_i-^{M}p_1)$ of the machine tool 8.

If defining the vector showing the position of the positions and postures (end points) $^{B}P_{i,j}$ (j=1, 2, . . . , $n_i$) of the robot at the time of the end of the "automatic touchup processing" as $^{B}p_{i,j}$ and defining the rotation matrix showing the posture as $^{B}R_{i,j}$, the position of the point of interest 31 in the robot coordinate system Σb can be found by formula: $^{B}p_{i,j}+^{B}R_{i,j}{^{F}p_s}$ using the position $^{F}p_s$ of the point of interest 31 at the mechanical interface coordinate system Σf.

In the ideal state, that is, when all of the components of the error parameter $P_{ID}$ are zero and there is no error in positioning of the machine tool 8, at all stop positions $^{M}p_i$ (i=1, 2, . . . , m) of the machine tool 8, the position $^{B}p_{i,j}+^{B}R_{i,j}{^{F}p_s}$ (j=1, 2, . . . , $n_i$) of the point of interest 31 at the robot coordinate system Σb matches the position $^{B}p_t+^{B}R_M(^{M}p_i-^{M}p_1)$ of the target 6 at the robot coordinate system Σb.

As opposed to the ideal state where no error occurs, in fact, there is positional error $e_{i,j}=(^{B}p_{i,j}+^{B}R_{i,j}{^{F}p_s})-(^{B}p_t+^{B}R_M(^{M}p_i-^{M}p_1))$ between the position of the point of interest 31 and the position of the target 6 at the robot coordinate system Σb according to the error parameters $P_{ID}$ including error of the mechanical parameters or rotation matrix. As will be understood from the geometric relationship, if considering the values of the different drive axes of the robot 1 fixed to constant values, $^{B}p_{i,j}+^{B}R_{i,j}{^{F}p_s}$ becomes a function of $P_{ID}$. Therefore, $e_{i,j}$ also becomes a function of $P_{1D}$.

Using the Newton-Raphson method, the $P_{ID}$ which gives the minimum value of the error $E=[e_{1,1}, \ldots, e_{i,j}, \ldots, e_{m,nm}]$ between the position $^B p_{i,j} + ^B R_{i,j} {}^F p_s$ of the point of interest 31 in the robot coordinate system $\Sigma b$ corresponding to the different stop positions of the machine tool 8 and the positions and postures of the robot 1 at the different end points and the target position $^B p_t + ^B R_m (^M p_i - ^M p_j)$ of the robot coordinate system $\Sigma b$ is found. Further, this is updated by replacement of the mechanical parameters of the robot 1 with the calculated values.

According to the calculation system according to the present embodiment, the high positioning precision of the machine tool 8 is utilized to find the position of the target 6 fixed at the machine tool 8 from the distance of movement of the machine tool 8. For this reason, it is no longer necessary to increase the measurement positions and postures each time increasing the positions of the target 6. Specifically, in the present embodiment, while the error parameters of the rotation matrix increase by three, even if increasing the number "m" of positions of the targets measured, the parameters to be identified and calculated do not increase. Therefore, when performing measurement for two target positions (m=2), the numbers of the measurement positions and postures required for identification and calculation remains the same as when setting a plurality of targets. However, if performing the measurement for three or more target positions (m>2), the numbers of the measurement positions and postures required for the identification and calculation can be reduced by exactly m−2 compared with the case of setting a plurality of targets.

In this way, according to the present embodiment, the precision of positioning of the robot 1 is uniformly improved in the range of operation of the robot 1 by a simple means. Further, at the same time as error of the mechanical parameters, it is possible to find the error of the rotation matrix between the robot coordinate system $\Sigma b$ and the machine tool coordinate system $\Sigma m$.

Above, various embodiments of the present invention were explained, but a person skilled in the art would recognize that other embodiments as well may be used to realize the actions and effects intended by the present invention. In particular, the component elements of the embodiments explained above can be deleted or replaced without departing from the scope of the present invention and known means can be further added. Further, the fact that the features of the plurality of embodiments which are explicitly or implicitly disclosed in this specification can also be freely combined so as to work the present invention is self evident to a person skilled in the art.

According to the present invention, the targets arranged at a plurality of positions by the movement of the machine tool are measured and the mechanical parameters of the robot are corrected. Due to this, the precision can be uniformly improved over the operating range of the robot by a small number of times of measurement compared with when setting a plurality of targets. Further, according to the present invention, at the same time as error of the mechanical parameters, error of the rotation matrix showing the relative relationship of posture between the robot coordinate system and the machine tool coordinate system is sought.

What is claimed is:

1. A measurement system comprising:
   a multi-articulated robot including a light receiving device at a front end of an arm; and
   a machine tool that is provided inside a range of operation of the robot and utilizes the light receiving device to measure a target fastened to the machine tool, wherein the target has a geometric feature enabling identification of information on a position of an image of the target formed on a light receiving surface of the light receiving device and information on a length relating to a distance between the light receiving device and the target, and
   the measurement system further comprises:
   a measurement position/posture determining part determining a plurality of stop positions of the machine tool and a plurality of measurement positions and postures of the robot whereby when the machine tool is at the plurality of stop positions, the target is included in a field of vision of the light receiving device,
   a positioning part successively positioning the machine tool at the plurality of stop positions and successively positioning the robot at the plurality of measurement positions and postures corresponding to the plurality of stop positions,
   a target detecting part forming the image of the target on the light receiving surface of the light receiving device and using information on the position of the target and information on the length as the basis to detect information on the distance between the light receiving device and the target,
   a robot moving part moving the robot so that in a state where the machine tool is at a stop position and the robot is at a measurement position and posture, a difference between a position of the target on the light receiving surface of the light receiving device and a predetermined location of the image acquired by the light receiving device becomes within a predetermined error and a difference of information on the distance and a predetermined value becomes within a predetermined error,
   a robot end point storing part storing positions and postures of the robot after being moved by the robot moving part as end points linked with the stop positions of the machine tool and the measurement positions and postures, and
   a calculating part using the plurality of end points corresponding to the plurality of stop positions and the plurality of measurement positions and postures and the plurality of stop positions as the basis to simultaneously find error of the mechanical parameters of the robot and a correspondence between the coordinate system of the robot and the coordinate system of the machine tool.

2. The measurement system according to claim 1, wherein the measurement position/posture determining part is configured to determine the plurality of measurement positions/postures so that a distance between the light receiving device and a predetermined point of the target is constant and a slant of a line of sight of the light receiving device passing through the predetermined point differs.

3. The measurement system according to claim 1, wherein the measurement position/posture determining part is configured to determine the plurality of measurement positions/postures so that a posture of a line of sight of the light receiving device passing through a predetermined point of the target is constant and a distance between the light receiving device and the predetermined point of the target differs.

4. The measurement system according to claim 1, wherein the measurement position/posture determining part is configured to automatically generate the plurality of measurement positions and postures.

5. The measurement system according to claim 1, wherein the calculating part is configured to utilize nonlinear optimization including the Newton-Raphson method, a genetic algorithm, and a neural network so as to find the error of the mechanical parameters of the robot.

6. The measurement system according to claim 1, wherein the light receiving device is a CCD camera configured to capture a 2D image.

7. The measurement system according to claim 1, wherein the target has a circular mark and wherein the information on length includes a long axis length of an oval corresponding to the image of the mark formed on the light receiving surface of the light receiving device.

8. The measurement system according to claim 1, wherein the light receiving device is a PSD configured to find a center of gravity of distribution of the amount of light received.

9. The measurement system according to claim 8, wherein the target is a light emitting device.

10. The measurement system according to claim 1, wherein the calculating part is configured to use the error between the position of a point of interest of the light receiving device and the position of a predetermined point of the mark formed on the target as the basis to find the error of the mechanical parameters of the robot.

11. A calibration method for calibrating mechanical parameters of a robot using a measurement system comprising a multi-articulated robot including a light receiving device at a front end of an arm and a machine tool provided inside a range of operation of the robot, the calibration method comprising
   determining a plurality of stop positions of the machine tool and a plurality of measurement positions and postures of the robot whereby when the machine tool is arranged at the plurality of stop positions, a target fastened to the machine tool is included in a field of vision of the light receiving device,
   successively positioning the machine tool at the plurality of stop positions and successively positioning the robot at the plurality of measurement positions and postures corresponding to the plurality of stop positions,
   forming the image of the target on the light receiving surface of the light receiving device and using information on the position of the target and the information on length as the basis to detect information on the distance between the light receiving device and the target,
   moving the robot so that in a state where the machine tool is at a stop position and the robot is at a measurement position and posture, a difference between a position of the target on the light receiving surface of the light receiving device and a predetermined location of the image acquired by the light receiving device becomes within a predetermined error and a difference of information on the distance and a predetermined value becomes within a predetermined error,
   storing positions and postures of the robot after being moved based on the error as end points linked with the stop positions of the machine tool and the measurement positions and postures, and
   using the plurality of end points corresponding to the plurality of stop positions and the plurality of measurement positions and postures and the plurality of stop positions as the basis to simultaneously find error of the mechanical parameters of the robot and a correspondence between the coordinate system of the robot and the coordinate system of the machine tool.

12. The calibration method according to claim 11 further comprising, when finding error of the mechanical parameters of the robot, using an error between a position of a point of interest of the light receiving device and a position of a predetermined point of a mark formed on the target as the basis to find error of the mechanical parameters of the robot.

* * * * *